United States Patent
Abramoff et al.

(10) Patent No.: US 10,783,639 B2
(45) Date of Patent: Sep. 22, 2020

(54) SYSTEM AND METHOD FOR N-DIMENSIONAL IMAGE SEGMENTATION USING CONVOLUTIONAL NEURAL NETWORKS

(71) Applicant: UNIVERSITY OF IOWA RESEARCH FOUNDATION, Iowa City, IA (US)

(72) Inventors: Michael D. Abramoff, Iowa City, IA (US); Xiaodong Wu, Coralville, IA (US)

(73) Assignee: University of Iowa Research Foundation, Iowa City, IA (US)

( * ) Notice: Subject to any disclaimer, the term of this patent is extended or adjusted under 35 U.S.C. 154(b) by 130 days.

(21) Appl. No.: 15/788,509

(22) Filed: Oct. 19, 2017

(65) Prior Publication Data
US 2018/0108139 A1    Apr. 19, 2018

Related U.S. Application Data

(60) Provisional application No. 62/410,239, filed on Oct. 19, 2016.

(51) Int. Cl.
*G06N 3/04* (2006.01)
*G06T 7/11* (2017.01)
*G06N 3/08* (2006.01)

(52) U.S. Cl.
CPC ............. *G06T 7/11* (2017.01); *G06N 3/0445* (2013.01); *G06N 3/0454* (2013.01); *G06N 3/084* (2013.01); *G06T 2200/04* (2013.01); *G06T 2207/10072* (2013.01); *G06T 2207/10136* (2013.01); *G06T 2207/20081* (2013.01); *G06T 2207/20084* (2013.01); *G06T 2207/20124* (2013.01)

(58) Field of Classification Search
CPC ............... G06T 7/11; G06T 2200/04; G06T 2207/10136; G06T 2207/10072; G06T 2207/20081; G06T 2207/20084; G06T 2207/20124; G06N 3/0454; G06N 3/0445; G06N 3/084
See application file for complete search history.

(56) References Cited

U.S. PATENT DOCUMENTS 8,594,402 B2 *  11/2013  Shirasaka ............. G06F 19/321
                                                                                        382/128

OTHER PUBLICATIONS

Mingyuan Jiu, Christian Wolf, Graham Taylor, and Atilla Baskurt: ("Human Body Part Estimation from Depth Images via Spatially-Constrained Deep Learning", Pattern Recognition Letters 50 (2014); pp: 122-129. (Year: 2014).*
Aaron Wu, Ziyue Xu, Mingchen Gao, Marion Buty, and Daniel J. Mollura: ("Deep Vessel Tracking: A Generalized Probabilistic Approach via Deep Learning", 2016 IEEE, pp. 1363-1367. (Year: 2016).*

(Continued)

*Primary Examiner* — Siamak Harandi
(74) *Attorney, Agent, or Firm* — Ballard Spahr LLP

(57) ABSTRACT

Disclosed are systems and methods for image segmentation using convolutional networks. Image data comprising an image hypervolume can be received. The image hypervolume can be provided to a trained convolutional neural network (CNN). The CNN can output a segmentation of the image hypervolume.

25 Claims, 5 Drawing Sheets

(56) References Cited

OTHER PUBLICATIONS

A. Duygu Arbatli and H. Levent Akin "Rule Extraction from Trained Neural Networks Using Genetic Algorithms", 1997, Nonlinear Analysis, Theory, Metjods & Applications, vol. 30, No. 3, pp. 1639-1648. (Year: 1997).*

Congji He, Meng Ma, Ping Wang "Extract Interpretability-Accuracy Balanced Rules from Artificial Neural Networks: A Review", 2020 , Neurocomputing 387, pp. 346-358. (Year: 2020).*

* cited by examiner

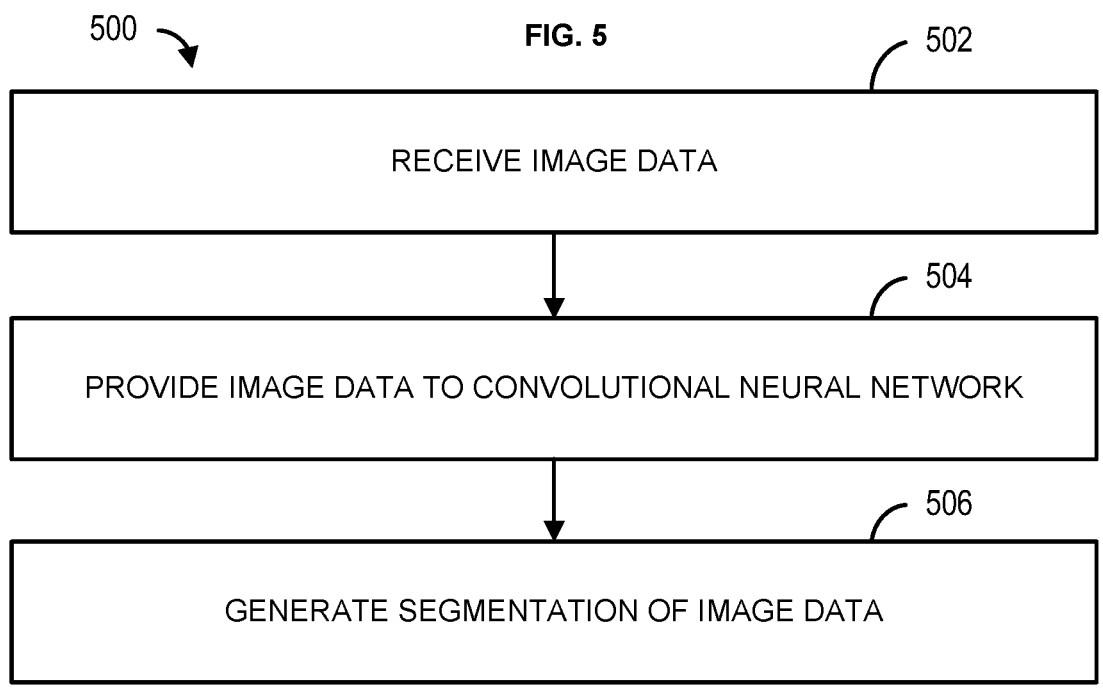

SYSTEM AND METHOD FOR N-DIMENSIONAL IMAGE SEGMENTATION USING CONVOLUTIONAL NEURAL NETWORKS

CROSS REFERENCE TO RELATED APPLICATIONS

This application claims priority to U.S. Provisional Application 62/410,239, filed Oct. 19, 2016, hereby incorporated by reference in its entirety.

BACKGROUND

Segmentation can be used to quantify regions or areas of an image. For example, segmentation can be used to quantify areas in tissue images to assist in medical diagnoses or medical management. For accurate quantification, it is preferred that the boundaries between the tissue(s) of interest are continuous, without gaps.

SUMMARY

Image segmentation can be used to quantify areas or regions in tissue images to assist in medical diagnoses and medical management. Existing approaches implement non-probabilistic models, such as graph search and graph cut approaches, which require substantial and clinical expertise to model the tissue of interest adequately. Other approaches use probabilistic models. The features to create these probabilistic models again need to be defined manually, which is tedious and prone to error. Ideally there would be a segmentation technique that has high performance and learns these features and models from training data, while enforcing continuity of the output segmentation surfaces.

Deep learning approaches, and specifically convolutional neural networks (CNN) have been shown repeatedly to outperform classical image analysis techniques and even human experts for detection and recognition and detection of objects in images, and even in medical images.

However, there is no straightforward approach to use CNN for image segmentations, as the output of standard CNNs is not constrained to be continuous. Required is a deep teaming based approach to segmentation that learns both the features and models from training data without intervention by a human expert, while enforcing continuity of the output segmentation surfaces.

BRIEF DESCRIPTION OF THE DRAWINGS

The accompanying drawings, which are incorporated in and constitute a pail of this specification, illustrate embodiments and together with the description, serve to explain the principles of the methods and systems:

FIG. 5 is a flowchart for an example method.

DETAILED DESCRIPTION

Figure 1:
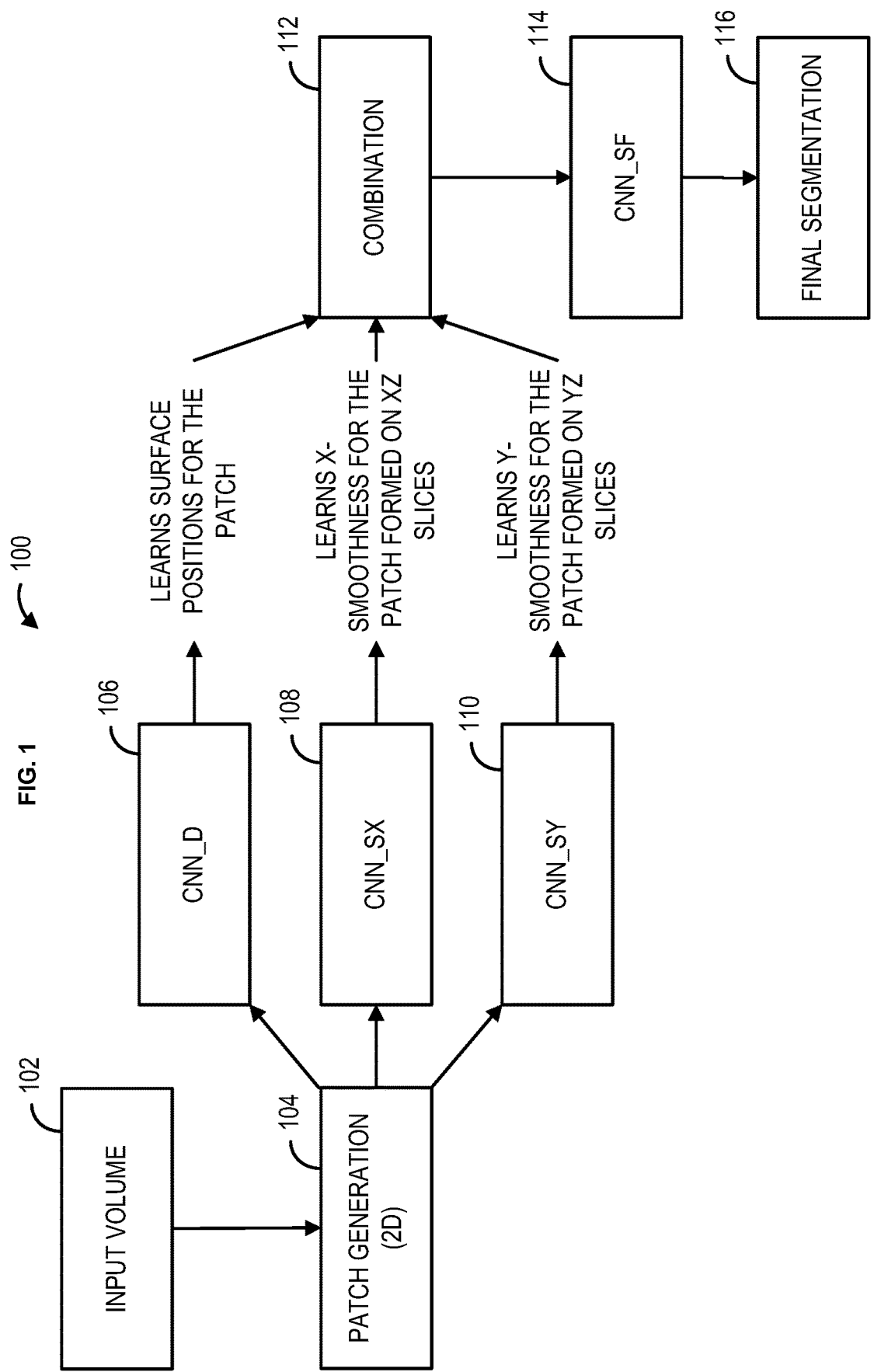
FIG. 1 is a process flow for single surface segmentation.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present invention is discussed in the following largely with reference to the medical industry, but the present invention is applicable to a variety of contexts and environments, including those that may utilize multidimensional data, for example, radar, sonar, lidar, X-ray, ultrasound, optical imaging, seismology data, ionosperic tomography, and many others.

Diagnostic imaging has influenced many aspects of modern medicine. The availability of volumetric images from X-ray computed tomography (CT), magnetic resonance (MR), 3-D ultrasound, positron emission tomography (PET), Optical Coherence Tomography and many other imaging modalities has permitted a new level of understanding of biology, physiology, anatomy to be reached, as well as facilitated studies of complex disease processes. While the ability to acquire new and more sophisticated medical images has developed very rapidly in the past 20 years, the ability to analyze medical imagery is often still performed visually and in a qualitative manner. A practicing physician, such as a radiologist or ophthalmologist seeking to quantitatively analyze volumetric information for example, to determine a tumor size, quantify its volumetric change from the previous imaging session, measure plaque volume, objectively assess airway reactivity to allergens throughout the lungs, etc. would largely be able only to manually outline regions of interest. Tools have been developed for the quantitative analysis of medical images, their usefulness is limited. The use of these tools is often tedious and time consuming and require user interaction, which does not improve physician productivity and care effectiveness. They frequently fail in the presence of disease. Therefore, they are typically unsuitable for routine employment. Since volumetric and/or dynamic medical images frequently cannot be reliably analyzed quantitatively using today's tools, a significant and possibly critical portion of the image information cannot be used for clinical diagnostic purposes.

Performing the segmentation directly in the 3-D space tends to bring more consistent segmentation results, yielding object surfaces instead of sets of individual contours. 3-D image segmentation techniques—for example, techniques known by the terms region growing, level sets, fuzzy connectivity, snakes, balloons, active shape and active appearance models—are known.

Reliable tools for automated image segmentation are a necessary prerequisite to quantitative medical image analyses. Medical image segmentation is frequently divided into two stages—localization of the object of interest (to distinguish the object from other objects in the image), and accurate delineation of the object's borders or surfaces. Almost universally known, segmentation methods that perform well on the task of robust object localization usually do not perform well with respect to the accurate border/surface delineation, and vice versa.

Quantitative analysis of volumetric medical images, especially layered tissues, is of high interest to improve productivity and quality in health care. Volume or surface area quantification of each separate layer or tissue is a refinement for specific clinical goals, including diagnosis and management of disease, and is called segmentation, because the boundaries of the layers or tissue need to be determined. There are essentially two different approaches to segmentation: probabilistic and non-probabilistic. In probabilistic segmentation, regions in the image or volume are categorized with respect to layer or tissue, without these regions being required to be contiguous. Non-probabilistic allows enforcement of a continuity constraint, so that the boundary of the tissues or layers are continuous. Creating an accurate non-probabilistic segmentation from a probabilistic one is non-trivial. One approach to non-probabilistic segmentation is graph search.

Recent improvements in computer hardware and GPU have allowed multi-layer ("deep") neural networks, so-called convolutional neural networks (CNNs), to outperform all other image analysis technique and even human experts on many different tasks. However, if applied straightforward, CNNs only allow probabilistic segmentation.

One embodiment of the present invention is directed to new optimal image segmentation methods that allow the identification of single surfaces as well as simultaneously allowing the identification of multiple interacting surfaces in 3-D and 4-D medical image datasets, that are continuous. Embodiments in accordance with the present invention uses convolutional neural networks (CNNs). Accordingly, the present disclosure sets forth a combination of CNNs with the constraints on non-probabilistic segmentation to require continuity of the determined boundaries.

In many segmentation methods, the segmentation behavior is controlled by the objective function that is employed. It is the goal of the segmentation process typically to optimize—that is minimize—the error of objective function. The objective functions are almost always task specific. Incorporating a priori knowledge reflecting the segmentation goal is a norm. In many cases, the objective function is specified by the human designer. Methods for automated design of objective functions are beginning to appear, and the present invention is but one of them. In the latter case, the form of the objective function and the objective function parameters are obtained via machine learning processes from objective functions from each example.

The present invention is directed to a number of imaging applications. Application examples include segmentation of single surfaces, e.g., segmentation of the diaphragm from volumetric CT images, or a 4-D extension of identifying diaphragm motion over time; segmentation of vessel wall layers in 3-D image data, e.g., from intravascular ultrasound or magnetic resonance and its 4-D extension of detecting the vessel wall surfaces over an entire cardiac cycle; segmentation of airway walls in individual airway tree segments from volumetric CT images, its topology-changing extension to identify surfaces of complete trees; tracking of such surfaces over time during the breathing cycle or—for vascular trees—over the cardiac cycle; segmentation of liver or kidney surfaces, tumor surfaces, as well as surfaces of bones, joints, or associated cartilages; surfaces separating cerebro-spinal fluid, gray matter and white matter in the brain, or possibly surfaces of deep anatomical structures in the brain, and ocular disease including glaucoma, diabetic macular edema and optic neuropathy.

It is to be appreciated that imaging for use in embodiments of the present invention can be achieved utilizing traditional scanners or any other image acquisition technique as would be appreciated by those having ordinary skill in the art.

It is to be understood that while the present invention is described with particularity with respect to medical imaging, the principles set forth in detail herein can be applied to other imaging applications. For example, other areas of application include geological, satellite imaging, entertainment, image-guided therapy/surgery and other applications as would be appreciated by those skilled in the art. Similarly, the principles can be applied to any n-D data sets containing non-image information. For the purposes of this application, an image is any scalar or vector function on n-dimensional coordinates, in which function values are representing some measurable property or a set of measurable properties associated with the said coordinates.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

In an aspect, image data can be described an N-dimensional matrix of discrete intensities. Such an N-dimensional matrix can be described as an image hypervolume. Examples of image hypervolumes can include tissue scans, including animal and human tissue. Such scans can include 3D scans, or 3D+time (4D) scans. The scans can be generated by magnetic resonance imaging (MRI), computed tomography (CT) scans, optical coherence tomography (OCT) scans, ultrasound scans, or other scans as can be appreciated. In an aspect, the image hypervolume can be divided into multiple submatrices (subvolumes) of the same dimensionality, with the divisions (hypersurfaces) being continuous.

In an aspect, segmentation can be performed using a machine learning model such as a multilayer convolutional neural network (CNN). In an aspect, each neuron in an input layer of the CNN can correspond to an intensity node of the image hypervolume. In a further aspect, the output layer can represent a vector or matrix of hypersurface locations. In another aspect, the output layer can represent a vector or matrix of cost functions. In an aspect, the cost function can be a learned cost function. Additionally, in an aspect, the vector or matrix of cost functions represented by the output layer can be convex. In an aspect, the vector or matrix of hypersurface locations is enforced to be continuous.

In an aspect, the hypersurfaces are determined through solving for the local minima over some distance along all columns substantially simultaneously with a convex programming solver. For example, the solver can include the alternating direction method of multipliers (ADMM) or another first order method.

In an aspect, the CNN can be trained using a set of submatrices (patches) combined with an objective function applied to hyperdimensional locations of the hypersurfaces. In an aspect, the objective function can be learned. In an aspect, training the CNN can be performed using back propagation or other rules. Additionally, in an aspect, training the CNN can be performed using a training set including one or more confounders or adversarial samples. The adversarial samples can be versions of other samples that have been modified to induce or generate an expected false classification or segmentation result.

In an aspect, one or more variance inducing techniques such as rotation, translation, and scaling can be applied to the submatrices used to train the CNN in order to increase invariance of the trained CNN to such perturbations. Additionally, in an aspect, neurons in the output layer of the CNN can be used to apply one or more constraints on the continuous hypersurfaces. For example, such constraints can include a smoothness of the hypersurfaces, convexity of the hypersurfaces, and separation or distance between the hypersurfaces.

In an aspect, the hypervolume can include a 3D volume, with hypersurfaces corresponding to 3D terrain surfaces. In such an aspect, a set of vertical positions of columns in the hypervolume matrix can be derived from the hypersurface locations.

In another aspect, Consider an OCT image $I(x; y; z)$ of size $X \times Y \times Z$. A surface is defined as $S(x; y)$, Each $(x, y)$ pair forms a voxel column parallel to the z-axis, wherein the surface $S(x, y)$ intersects each column at a single voxel location. In this work, we present a slice by slice segmentation of an OCT volume. Patches are extracted from B-scans with the target machine generated truth.

After the extraction of the patches, data augmentation is performed by a combination of translation and rotation to the target surface profile with respect to the image patch. Data augmentation is necessary to reduce variance and ensuring that various different types of local profiles with given texture information is learnt by the CNN, thus allowing the CNN to infer on every possible surface profile. For each training patch, three additional training patches can be created as described below.

A random translation value can be chosen between −250 and 250 such that the translation can be within the range of the patch size. The training patch and the corresponding machine generated truth can be translated accordingly.

A random rotation value can be chosen between −55 degrees and 55 degrees. The training patch and the corresponding machine generated truth can be rotated accordingly by that amount.

A combination of the rotation and translation can be used to generate another patch.

The CNN contains three convolution layers, each of which is followed by a max-pooling layer with stride length of two. Thereafter, it is followed by two fully connected layers where the last fully connected layer represents the final output of the middle $N/2$ surface positions for P. From the input patch to the final fully connected layer, the sizes of the feature maps keep decreasing, which helps remove the potential redundant information in P and obtains discriminative features required for inferring the output surface positions for P. Lastly, a Euclidean loss function is utilized to compute the error between CNN output and machine generated truth of P for back propagation during the training phase. The network starts from a convolution layer, which convolves the input with a number of convolution kernels and yields corresponding number of output feature maps.

We use the rectified linear unit (ReLu) non-linearity for each convolution to perform the non-linear transformations. The ReLu is expressed as s=max(0; r), where r is the convolution output. Following each convolution layer, a max-pooling layer is introduced, which operates independently on each feature map produced by the previous convolution layer and downsamples each feature map according to the chosen stride size along both the height and width by employing a max operation. After, three convolution and max-pooling layers, fully connected layers are employed wherein each neuron in the fully connected layer have full connections to all activations in the previous layer. Finally, a Euclidean loss function (used for regressing to real-valued labels) is employed to compute the error on the CNN output.

Unsigned mean surface positioning error is the commonly used error metric for evaluation of surface segmentation accuracy in OCT images. The Euclidean loss function in fact computes sum of the squared unsigned surface positioning error between the N/2 surface position of the CNN output and the machine generated truth for P, thereby reciting the exact squared surface positioning error to be used for back propagation during training the network. In other words, the loss function can be interpreted as enforcing a quadratic penalty on the exact difference in the surface positions between the CNN output and the machine generated truth.

In another aspect, Each (x; y) pair forms a voxel column parallel to the z-axis, wherein the surface S(x; y) intersects each column at a single voxel location. For simultaneously segmenting λ (λ≥2) surfaces, the goal of the CNN is to learn the surface positions $S_i(x, y)$ (i∈λ) for columns formed by each (x, y) pair. In this work, we present a slice by slice segmentation of a 3-D volumetric image applied on OCT volumes. Patches are extracted from B-scans with the target Reference Standard (RS). Essentially, the target surfaces to be learnt is the surface locations for the middle N/2 consecutive columns in P. The overlap between consecutive patches ensures no abrupt changes occur at patch boundaries. By segmenting the middle N=2 columns in a patch size with N columns, the boundary of patches overlap with the consecutive surface segment patch. Then, data augmentation is performed, where for each training patch, three additional training patches can be created.

First, a random translation value can be chosen between −250 and 250 voxels such that the translation can be within the range of the patch size. The training patch and the corresponding RS for surfaces $S_i$'s can be translated in the z dimension accordingly. Second, a random rotation value can be chosen between −45 degrees and 45 degrees. The training patch and the corresponding RS for surfaces $S_i$'s can be rotated accordingly. Last, a combination of rotation and translation can be used to generate another patch.

For segmenting λ surfaces simultaneously, the CNN learns surfaces for each patch. The CNN contains three convolution layers, each of which is followed by a max-pooling layer with stride length of two. Thereafter, it is followed by two fully connected layers, where the last fully connected layer represents the final output of the middle N/2 surface positions for 2 target surfaces in P. Lastly, a Euclidean loss function (used for regressing to real-valued labels) is utilized to compute the error between CNN outputs and RS of $S_i$'s (i∈λ) within P for back propagation during the training phase. Unsigned mean surface positioning error (UMSPE) is one of the commonly used error metric for evaluation of surface segmentation accuracy. The Euclidean loss function (E), essentially computes sum of the squared unsigned surface positioning error over the N/2 consecutive surface position for Si's of the CNN output and the RS for P.

In another aspect, Given a volumetric image I(x, y, z) of size X×Y×Z, a terrain like surface is defined as S(x, y), where x∈x={0, 1, ... X−1}, y∈y={0, 1, ... Y−1} and S(x, y)∈z={0, 1, ... Z−1}. Each (x, y) pair forms a voxel column parallel to the z-axis, wherein the terrain-like surface S(x, y) intersects each column at a single voxel location. We will investigate two different strategies to segment single and multiple terrain-like surfaces using deep learning, the patch based as described in the Innovation section and slice based. The image volume is the only required input. In order for the Constrained CNN to directly learn the consecutive surface positions, we represent a single target surface for each B-scan of a given input image as a vector: $m_1$ consecutive target surface positions are represented as an $m_1$-D vector, which may be interpreted as a point in $m_1$-D space, while maintaining a strict order of the target surface positions. The ordering of the target surface positions partially encapsulates the piecewise smoothness of the surface. The error (loss) function to back propagate the error is a Euclidean loss function as shown in Equation 1, where the network adjusts the weights of the various Euclidean distances between the CNN output and the target surface positions in $m_1$-D space. The Euclidean loss function is very similar to the unsigned mean surface positioning error metric, a widely used metric to evaluate the accuracy of surface segmentations, thus minimizing the squared surface positioning error of the segmentations with respect to the truth:

$$E = \Sigma_{k_1=0}^{k_1=N-1} (\bar{a}_{k_1} - a_{k_1})^2$$

where N is the number of columns in a given B-scan, $\bar{a}_{k_1}$ and $a_{k_1}$ the $k_1$-th surface position of the truth and the CNN output respectively. Similarly for λ multiple surfaces are represented as a $m_2$-D vector, where λ={1, 2, ... λ}, $m_2 = \lambda \times m_1$ and $m_1$ consecutive surface positions for a surface index i (i∈λ) are given by {((i−1)×$m_1$)+1, ((i−1)×$m_1$)+2, ... ((i−1)×$m_1$)+$m_1$} index elements in the $m_2$-D vector. The loss function employed for training the Constrained CNN for multiple surfaces is:

$$E = \Sigma_{i=1}^{i=\lambda} \Sigma_{k_1=0}^{k_1=N-1} (\bar{a}_{k_1}^i - a_{k_2}^i)^2$$

where N is the number of columns in a given B-scan, $k_2 = ((i-1) \times N) + k_1$, $\bar{a}_{k_1}^i$ and $a_{k_1}^i$ is the $k_1$-th surface position of the truth and the Constrained CNN output respectively for a given surface $S_i$.

A patch $P(x_1, z)$ is of size N×Z, where $x_1 \in x_1 = \{0, 1, ... N-1\}$ ($x_1$ represents the number of columns in a patch), $z \in z = \{0, 1, ... Z-1\}$ and N is a multiple of 4. The target surfaces $S_i$'s to be learnt simultaneously from P are $\bar{S}_i(x_2) \in z = \{0, 1, ... Z-1\}$, where $x_2 \in x_2 = \{(N/4), (N/4)+1, ... (3N/4)-1\}$. Essentially, the target surfaces to be learnt are the surface locations for the middle N/2 consecutive columns in P.

The proposed framework does not utilizes 3D convolutions which are computationally intensive but uses the entire set of xy-slices simultaneously with 2D convolutions and concatenating the same at each level. The proposed network architecture is inspired from UNet and will directly learn the entire segmentation of multiple surfaces for a given input volume in one shot. For a given image volume I(x, y, z) of size X×Y×Z, λ target surfaces can be represented as λX Y surface position maps. A slice is generally identified as the xz-slices as used in the patch based method. We exploit the xy-slices in this model. The network starts with each input xy-slice and uses i consecutive blocks ($B_i$) of network layers. Each block $B_i$ comprises of a convolution layer, a batch normalization layer, Rectified Linear Unit (ReLU) activation, concatenation layer to group 4 outputs and a pooling layer. The architecture starts with 3 blocks ($B_i$). Thereafter, it is followed by Unpooling and convolution layers, resulting in an output surface position map of size λX Y. The Euclidean loss function is then applied to the output surface position maps for back propagation during the training phase.

Training a single Constrained CNN to segment 14 surfaces may not be practical. We will hence use a hierarchical two CNN based segmentation inspired by the ordering of segmentation of surfaces as exploited in multi resolution graph search method. Herein the first CNN will segment β surfaces which is simpler compared to the remaining 14-β surfaces given the textural and gradient information. The second CNN will use the segmentations from the first CNN to constrain the segmentation of the 14-β surfaces based on the ordering of the surfaces in the z-dimension. The constraint will be directly introduced in the loss function by adding a term constraining the surfaces to be segmented by the second CNN to lie between 2 given surfaces segmented from the first CNN. To segment 4D data, in this case time series of 3D volumes, the framework is flexible enough to incorporate 4D information by creating multi-channel 2D patches/slices by concatenation of the patches/slices at each time instant and utilizing proper truth for the surfaces at each time instant.

FIG. 1 is an example process flow 100 for single surface segmentation in two dimensions using a CNN. Step 102 represents an input volume, i.e. an image volume to be segmented. The input volume serves as an input for two-dimensional patch generation at step 104. The output from the patch generation is applied to three different CNNs, shown as steps 106, 108, and 110, respectively. CNN_D, shown as step 106, can be interpreted as learning the data term as used in graph search. For analytical inference purposes, like using the alternating direction method of multipliers (ADMM) algorithm, an appropriate curve (convex function) can be fitted for each of the columns with the inferred surface position for that column as a global minima.

CNN_sx, shown at step 108, learns the surface profile in the x-direction (the local smoothness between surface position of 2 neighboring columns) and similarly CNN_sy, shown at step 110, learns the surface profile in the y direction. The results of each of steps 106, 108, and 110 shall result in a 2D image (by accumulation of results from every patch generated from the volume. The combination step 112 combines the results of the 3 CNNs and generates a 2D image I, where each pixel in I is a vector with three elements, namely surface position, x-smoothness and y-smoothness. This is provided at step 114 as an input to CNN-sf, which is a CNN that learns from I to infer the final surface segmentation, shown at step 116.

Figure 2:
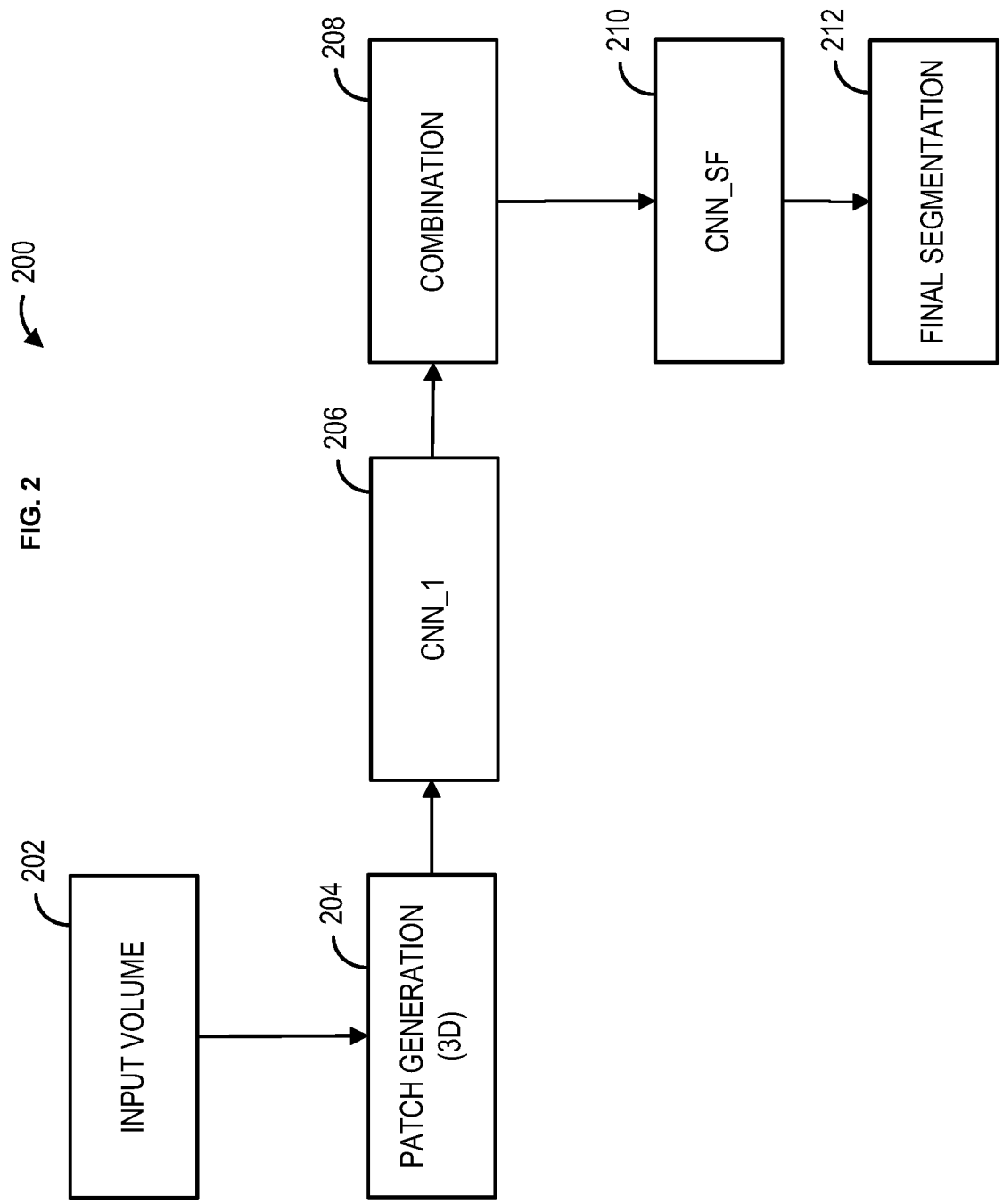
FIG. 2 is a process flow for multiple surface segmentation.

FIG. 2 is a process flow 200 for multiple surface segmentation using CNN in 3D. An input volume at step 202 serves as an input for 3D patch generation at step 204. The patches are generated as 3D sub-volumes from the input volumes to train CNN_1, identified at step 206. CNN_1 learns the surface positions, x-smoothness and y-smoothness for each surface. Additionally, it learns the surface separation between two adjacent surfaces.

For segmenting N surfaces, CNN_1 shall output a vector of labels comprising of (4N−1)×(no. of surface positions in the given patch) elements. At step 208, these output vectors are decomposed into 2D images representing the surface positions of a given surface, x-smoothness of a given surface, y-smoothness of a given surface and surface separation between 2 adjacent surfaces. The 2D images are then combined into a single 2D image I with each pixel represented as a vector with $N-1$ elements. This 2D image I is provided to CNN_sf at step 210. CNN_sf learns from image I to output the final surface segmentations for N surfaces, shown at step 212.

Figure 3:
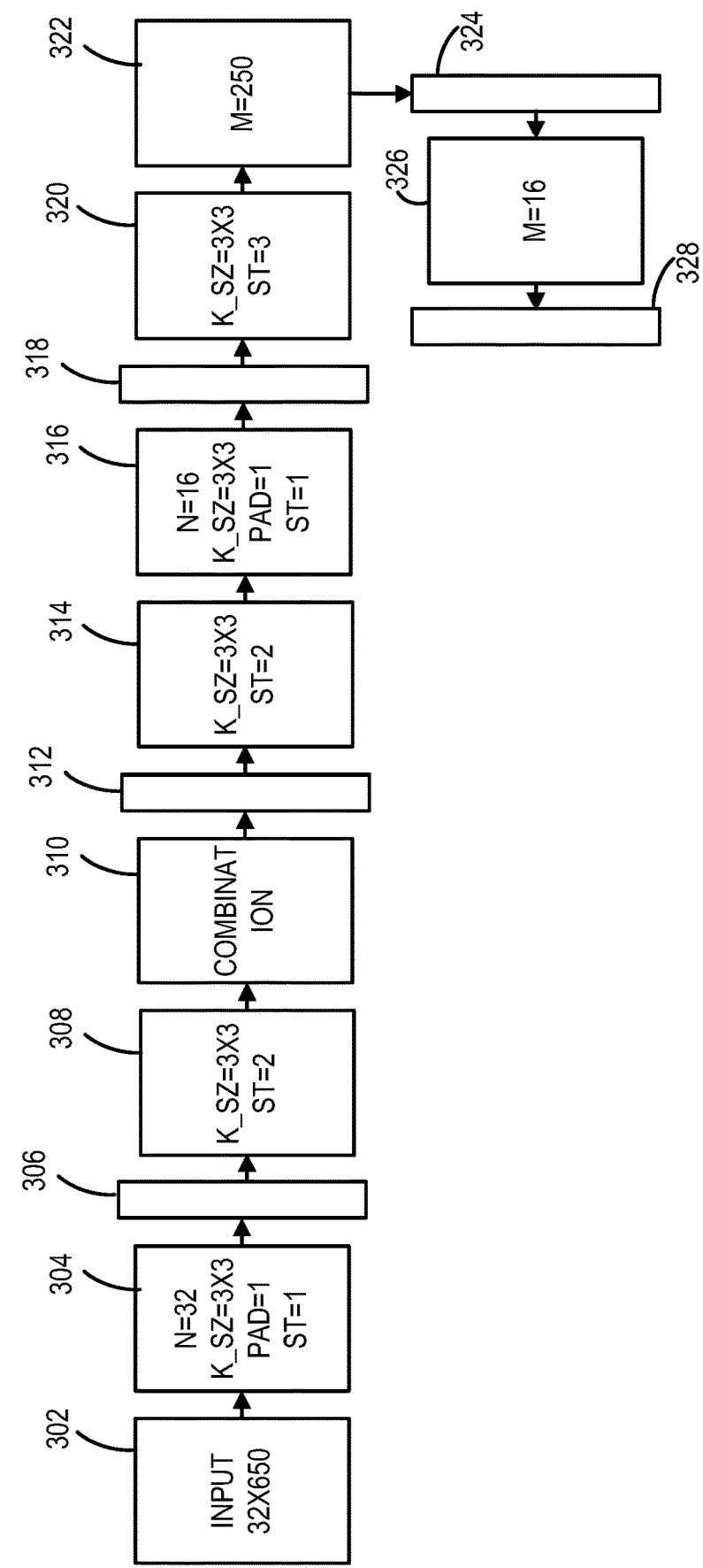
FIG. 3 is an example neural network architecture.

FIG. 3 shows an example neural network model 300. Depicted layers in the neural network model 300 can include the following constraints: N is the number of kernels, K_sx is a kernel size, Pad=1 indicates that there is padding, while Pad=0 indicates no padding, St indicates stride, and M is the number of neurons in a fully connected layer. Although the following example model sets forth various numerical constraints for parameters of the neural network model 300, it is understood that these constrains are only exemplary. Layer 302 is an input layer corresponding to an input patch to infer the middle 16 surface positions. Layers 304, 310, and 316 are convolution layers. Layers 306, 312, 318, and 324 are rectifier linear unit (RELU) layers. Layers 308, 314, and 320 are max pool layers. Layers 322 and 325 are fully connected layers, and layer 328 is a Euclidian loss layer.

The fully connected layers 322 and 325 are utilized towards the end of the network architecture to accumulate and reduce the number of neurons in the previous layer to the number of desired output neurons. These layers can be interpreted as the traditional hidden neuron layer of a shallow network. Herein, each neuron is connected to each and every neuron in the previous layer with a weight and a bias, which is shared by all the connections from the neuron in the fully connected layer to the neurons in the previous layers. The output of layer 325 is the surface positions.

To incorporate surface smoothness and separation using a single CNN network, one can impose additional smoothness deviation and separation deviation penalties to the Euclidian loss layer 328.

Figure 4:
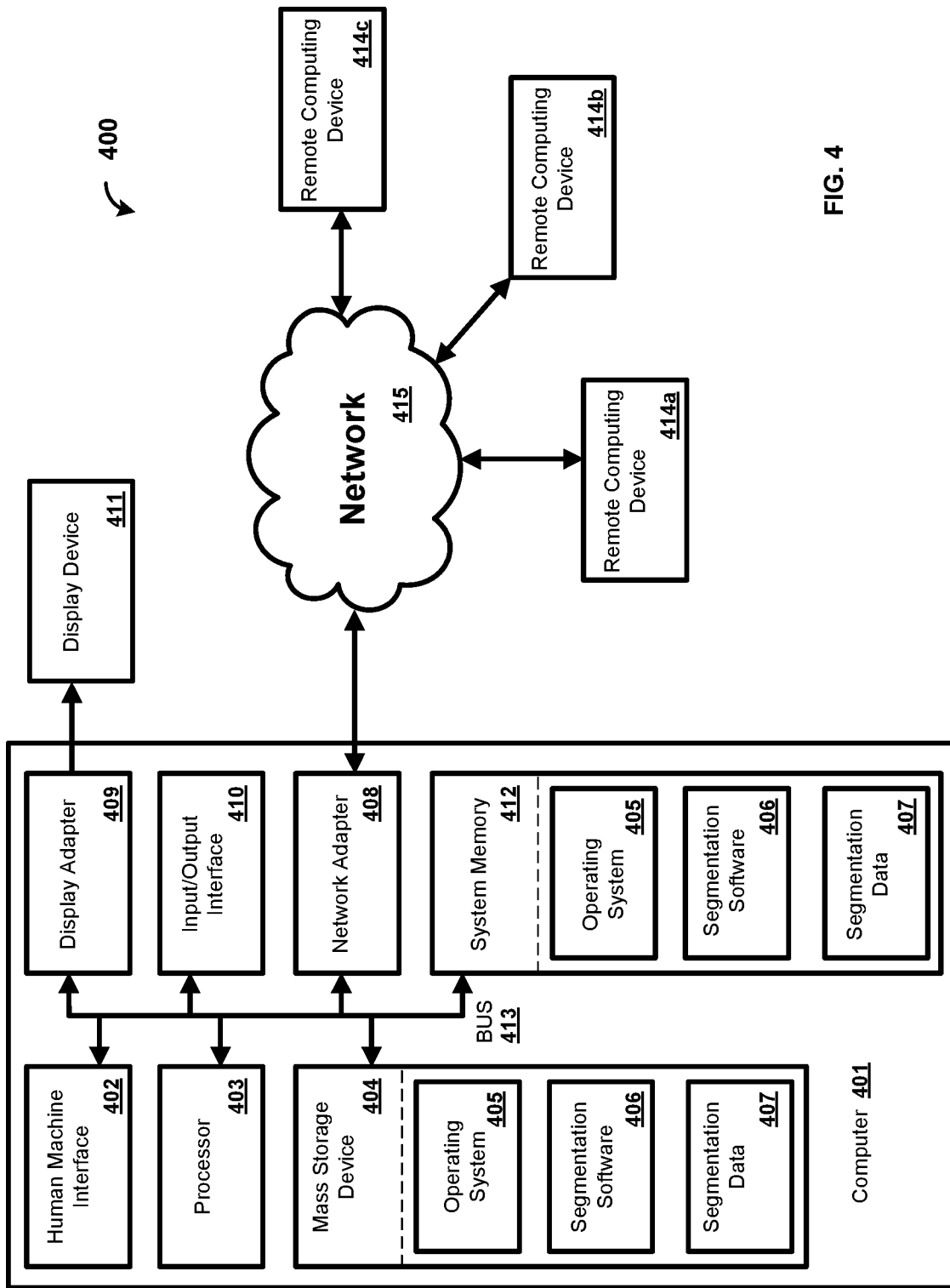
FIG. 4 is a block diagram of a computing device.

In an exemplary aspect, the methods and systems can be implemented on a computer 401 as illustrated in FIG. 4 and described below. Similarly, the methods and systems disclosed can utilize one or more computers to perform one or more functions in one or more locations. FIG. 4 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 401. The components of the computer 401 can comprise, but are not limited to, one or more processors 403, a system memory 412, and a system bus 413 that couples various system components including the one or more processors 403 to the system memory 412. The system can utilize parallel computing.

The system bus 413 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 413, and all buses specified in this description can also be implemented over a wired or wireless network connection and each of the subsystems, including the one or more processors 403, a mass storage device 404, an operating system 405, segmentation software 406, segmentation data 407, a network adapter 408, the system memory 412, an Input/Output Interface 410, a display adapter 409, a display device 411, and a human machine interface 402, can be contained within one or more remote computing devices 414a,b,c at physically separate locations, connected through buses of this form, in effect implementing a fully distributed system.

The computer 401 typically comprises a variety of computer readable media. Exemplary readable media can be any available media that is accessible by the computer 401 and comprises, for example and not meant to be limiting, both volatile and non-volatile media, removable and non-removable media. The system memory 412 comprises computer readable media in the form of volatile memory, such as random access memory (RAM), and/or non-volatile memory, such as read only memory (ROM). The system memory 412 typically contains data such as the segmentation data 407 and/or program modules such as the operating system 405 and the segmentation software 406 that are immediately accessible to and/or are presently operated on by the one or more processors 403.

In another aspect, the computer 401 can also comprise other removable/non-removable, volatile/non-volatile computer storage media. By way of example, FIG. 6 illustrates the mass storage device 404 which can provide non-volatile storage of computer code, computer readable instructions, data structures, program modules, and other data for the computer 401. For example and not meant to be limiting, the mass storage device 404 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 404, including by way of example, the operating system 405 and the segmentation software 406. Each of the operating system 405 and the segmentation software 406 (or some combination thereof) can comprise elements of the programming and the segmentation software 406. The segmentation data 407 can also be stored on the mass storage device 404. The segmentation data 407 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 401 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 403 via the human machine interface 402 that is coupled to the system bus 413, but can be connected by other interface and bus structures, such as a parallel port, game port, an IEEE 1394 Port (also known as a Firewire port), a serial port, or a universal serial bus (USB).

In yet another aspect, the display device 411 can also be connected to the system bus 413 via an interface, such as the display adapter 409. It is contemplated that the computer 401 can have more than one display adapter 409 and the computer 401 can have more than one display device 411. For example, the display device 411 can be a monitor, an LCD (Liquid Crystal Display), or a projector. In addition to the display device 411, other output peripheral devices can comprise components such as speakers (not shown) and a printer (not shown) which can be connected to the computer 401 via, the Input/Output Interface 410. Any step and/or result of the methods can be output in any form to an output device. Such output can be any form of visual representation, including, but not limited to, textual, graphical, animation, audio, tactile, and the like. The display device 411 and computer 401 can be part of one device, or separate devices.

The computer 401 can operate in a networked environment using logical connections to one or more remote computing devices 414a,b,c. By way of example, a remote computing device can be a personal computer, portable computer, smartphone, a server, a router, a network computer, a peer device or other common network node, and so on. Logical connections between the computer 401 and a remote computing device 414a,b,c can be made via a network 415, such as a local area network (LAN) and/or a general wide area network (WAN). Such network connections can be through the network adapter 408. The network adapter 408 can be implemented in both wired and wireless environments. Such networking environments are conventional and commonplace in dwellings, offices, enterprise-wide computer networks, intranets, and the Internet.

For purposes of illustration, application programs and other executable program components such as the operating system 405 are illustrated herein as discrete blocks, although it is recognized that such programs and components reside at various times in different storage components of the computing device 401, and are executed by the one or more processors 403 of the computer. An implementation of the segmentation software 406 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

FIG. 5 is a flowchart 500 of an example method. At step 502, image data can be received. In an aspect, image data can be described an N-dimensional matrix of discrete intensities. Such an N-dimensional matrix can be described as an image hypervolume. Examples of image hypervolumes can include tissue scans, including animal and human tissue. Such scans can include 3D scans, or 3D+time (4D) scans. The scans can be generated by magnetic resonance imaging (MRI), computed tomography (CT) scans, optical coherence tomography (OCT) scans, ultrasound scans, or other scans as can be appreciated. In an aspect, the image hypervolume can be divided into multiple submatrices (subvolumes) of the same dimensionality, with the divisions (hypersurfaces) being continuous.

At step 504 the image data can be provided to multilayer convolutional neural network (CNN). In an aspect, each neuron in an input layer of the CNN can correspond to an intensity node of the image hypervolume. In a further aspect, the output layer can represent a vector or matrix of hypersurface locations. In another aspect, the output layer can represent a vector or matrix of cost functions. In an aspect, the cost function can be a learned cost function. Additionally, in an aspect, the vector or matrix of cost functions represented by the output layer can be convex. In an aspect, the vector or matrix of hypersurface locations is enforced to be continuous. A segmentation of the image data can be generated at step 506 from the output of the CNN.

In an aspect, the hypersurfaces are determined through solving for the local minima over some distance along all columns substantially simultaneously with a convex programming solver. For example, the solver can include the alternating direction method of multipliers (ADMM) or another first order method.

In an aspect, the CNN can be trained using a set of submatrices (patches) combined with an objective function applied to hyperdimensional locations of the hypersurfaces. In an aspect, the objective function can be learned. In an aspect, training the CNN can be performed using back propagation or other rules. Additionally, in an aspect, training the CNN can be performed using a training set including one or more confounders or adversarial samples. The adversarial samples can be versions of other samples that have been modified to induce or generate an expected false classification or segmentation result.

In an aspect, one or more variance inducing techniques such as rotation, translation, and scaling can be applied to the submatrices used to train the CNN in order to increase invariance of the trained CNN to such perturbations. Additionally, in an aspect, neurons in the output layer of the CNN can be used to apply one or more constraints on the continuous hypersurfaces. For example, such constraints can include a smoothness of the hypersurfaces, convexity of the hypersurfaces, and separation or distance between the hypersurfaces.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications may be referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein.

What is claimed is:

1. A method comprising:
receiving image data comprising an image hypervolume, wherein the image hypervolume comprises a plurality of continuous hypersurfaces;
dividing, based on a segmentation algorithm, the image hypervolume into continuous patches, wherein the segmentation algorithm comprises a plurality of deep neural networks (DNNs) trained using an objective function and back propagation,
applying at least one of the plurality of DNNs to segment sub-hypersurfaces in each continuous patch;
aggregating the sub-hypersurfaces into a plurality of hypersurfaces; and
generating, based on the plurality of hypersurfaces, the plurality of continuous hypersurfaces.

2. The method of claim 1, wherein the plurality of DNNs comprises a plurality of convolutional neural networks.

3. The method of claim 1, wherein the plurality of DNNs comprises a plurality of recurrent neural networks.

4. The method of claim 1, wherein the plurality of DNNs comprises a plurality of both recurrent and convolutional neural networks.

5. The method of claim 1, further comprising training the plurality of DNN based on a plurality of submatrices combined with an objective function applied to hyperdimensional locations of the plurality of continuous hypersurfaces.

6. The method of claim 1, wherein the continuous patches are constrained to be overlapping in one or more dimensions.

7. The method of claim 1, further comprising training the plurality of DNNs using a training set comprising a plurality of adversarial or confounder image hypervolumes.

8. The method of claim 1, wherein the objective function is derived from human expert annotations.

9. The method of claim 1, wherein the objective function is derived from functional data.

10. The method of claim 1, wherein the objective function is derived from one or more other modalities.

11. The method of claim 1, wherein an output layer of the plurality of DNNs comprises one or more of a vector of hypersurface locations or a matrix of hypersurface locations.

12. The method of claim 11, wherein the one or more of the vector of hypersurface locations or the matrix of hypersurface locations is enforced to be continuous.

13. The method of claim 1, further comprising:
applying a plurality of variance inducing techniques to the image hypervolume or the resulting submatrices of the image hypervolume; and
training the plurality of DNNs using the resulting image hypervolumes or submatrices of the image hypervolume.

14. The method of claim 13, wherein the plurality of variance inducing techniques comprise one or more of rotation, translation, scaling, warping or adding noise.

15. An apparatus comprising:
one or more processors; and
a memory storing processor executable instructions that, when executed by the one or more processors, cause the apparatus to:
receive image data comprising an image hypervolume, wherein the image hypervolume comprises a plurality of continuous hypersurfaces;
provide the image hypervolume to a segmentation algorithm, wherein an output layer of the segmentation algorithm comprises one or more of a vector of hypersurface locations or a matrix of hypersurface locations;
generate, from an output of the segmentation algorithm, the plurality of continuous hypersurfaces;
apply one or more variance inducing techniques to one or more submatrices of the image hypervolume; and
train a plurality of deep neural networks (DNNs) using the result of applying the one or more variance inducing techniques to the one or more submatrices of the image hypervolume.

16. The apparatus of claim 15, wherein the processor executable instructions further cause the apparatus to train the segmentation algorithm based on a plurality of submatrices combined with an objective function applied to hyperdimensional locations of the plurality of continuous hypersurfaces.

17. The apparatus of claim 15, wherein the processor executable instructions further cause the apparatus to train the segmentation algorithm using back propagation.

18. The apparatus of claim 15, wherein the processor executable instructions further cause the apparatus to train the segmentation algorithm using a training set comprising one or more adversarial samples.

19. The apparatus of claim 15, wherein the one or more of the vector of hypersurface locations or the matrix of hypersurface locations is enforced to be continuous.

20. The apparatus of claim 15, wherein the output layer of the segmentation algorithm comprises one or more of a vector of cost functions or a matrix of cost functions.

21. The apparatus of claim 20, wherein one or more of the vector of cost functions or the matrix of cost functions is convex.

22. The apparatus of claim 15, wherein the one or more variance inducing techniques comprise one or more of a rotation, a translation, or a scaling.

23. A method comprising:
receiving image data comprising an image hypervolume, wherein the image hypervolume comprises a plurality of continuous hypersurfaces;
providing the image hypervolume to a segmentation algorithm wherein an output layer of the segmentation algorithm comprises one or more of a vector or a matrix of hypersurface locations;
generating, from an output of the segmentation algorithm, the plurality of continuous hypersurfaces;
applying one or more variance inducing techniques to one or more submatrices of the image hypervolume; and
training a plurality of deep neural networks (DNNs) using the result of applying the one or more variance inducing techniques to the one or more submatrices of the image hypervolume.

24. The method of claim 23, further comprising training the segmentation algorithm using back propagation.

25. The method of claim 23, further comprising training the segmentation algorithm using a training set comprising one or more adversarial samples.

* * * * *